United States Patent
Chakra et al.

(10) Patent No.: US 9,787,845 B2
(45) Date of Patent: Oct. 10, 2017

(54) THRESHOLD ACTIVATED TELECONFERENCING

(75) Inventors: Al Chakra, Apex, NC (US); Li Chen, Cary, NC (US); Edward C. Flickinger, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 13/566,066

(22) Filed: Aug. 3, 2012

(65) Prior Publication Data

US 2014/0037080 A1    Feb. 6, 2014

(51) Int. Cl.
*H04M 3/42*    (2006.01)
*H04M 3/56*    (2006.01)

(52) U.S. Cl.
CPC ...... *H04M 3/56* (2013.01); *H04M 2203/5054* (2013.01)

(58) Field of Classification Search
CPC .................. H04M 3/56; H04M 2203/5054
USPC ............................................ 379/202.01, 158
See application file for complete search history.

(56) References Cited

U.S. PATENT DOCUMENTS

| | | | | |
|---|---|---|---|---|
| 4,796,293 | A * | 1/1989 | Blinken et al. | 379/202.01 |
| 5,978,463 | A * | 11/1999 | Jurkevics et al. | 379/202.01 |
| 7,664,490 | B2 * | 2/2010 | Aaby et al. | 455/416 |
| 7,848,265 | B2 * | 12/2010 | Levy et al. | 370/260 |
| 8,358,762 | B1 * | 1/2013 | Renner et al. | 379/202.01 |
| 2001/0052081 | A1 * | 12/2001 | McKibben et al. | 713/201 |
| 2002/0051518 | A1 * | 5/2002 | Bondy et al. | 379/35 |
| 2003/0108002 | A1 * | 6/2003 | Chaney et al. | 370/261 |
| 2004/0037407 | A1 * | 2/2004 | Gourraud et al. | 379/202.01 |
| 2006/0008065 | A1 * | 1/2006 | Longman et al. | 379/158 |
| 2006/0079210 | A1 * | 4/2006 | Fujibayashi | 455/412.1 |
| 2007/0155412 | A1 * | 7/2007 | Kaltsukis | 455/466 |
| 2007/0172045 | A1 * | 7/2007 | Nguyen et al. | 379/202.01 |
| 2007/0225919 | A1 * | 9/2007 | Jeffrey et al. | 702/19 |
| 2007/0264989 | A1 * | 11/2007 | Palakkal et al. | 455/416 |
| 2008/0226039 | A1 * | 9/2008 | Goldman et al. | 379/45 |
| 2009/0005038 | A1 * | 1/2009 | Yasrebi et al. | 455/435.1 |
| 2009/0251529 | A1 * | 10/2009 | Tucker et al. | 348/14.09 |
| 2010/0149307 | A1 * | 6/2010 | Iyer et al. | 348/14.09 |
| 2010/0189242 | A1 | 7/2010 | Jenkins et al. | |
| 2010/0250321 | A1 * | 9/2010 | Farrell et al. | 705/9 |
| 2010/0324946 | A1 | 12/2010 | Ohmura et al. | |
| 2011/0033033 | A1 | 2/2011 | Koul et al. | |
| 2011/0087736 | A1 * | 4/2011 | Bieselin | 709/204 |
| 2011/0103568 | A1 * | 5/2011 | Gartner et al. | 379/202.01 |

(Continued)

*Primary Examiner* — William Deane, Jr.
(74) *Attorney, Agent, or Firm* — Steven M. Greenberg, Esq.; CRGO Law

(57) ABSTRACT

Embodiments of the present invention provide a method, system and computer program product for threshold activation of an audio teleconference. In an embodiment of the invention, a method for threshold activation of an audio teleconference is provided. The method includes receiving calls into a conference bridge for an audio conference and determining whether or not a threshold number of calls from corresponding callers have been received for the audio conference. The method also includes initiating the audio conference responsive to a threshold number of callers having called into the audio conference, but prohibiting initiation of the audio conference until the threshold number of callers have called into the audio conference.

6 Claims, 2 Drawing Sheets

(56) References Cited

U.S. PATENT DOCUMENTS

2012/0166242 A1\* 6/2012 Bentley et al. .............. 705/7.13
2013/0035055 A1\* 2/2013 Kirchmeier et al. ...... 455/404.1

\* cited by examiner

THRESHOLD ACTIVATED TELECONFERENCING

BACKGROUND OF THE INVENTION

Field of the Invention

The present invention relates to audio teleconference management and more particularly to activating an audio teleconference.

Description of the Related Art

Audio teleconferencing is a technology in which different individuals participate in a group meeting via telephone connection to one another. First developed nearly sixty years ago as a business tool, audio teleconferencing once was considered an extremely costly tool. Today, however, the costs of audio conferencing have been reduced to very little and in some cases, there is no cost at all. In particular, the advent of the Internet and Internet protocol (IP) telephony now permits modestly robust teleconferencing as a feature integrated into standard telephony services.

Audio teleconferencing requires the establishment of a common point of termination for all telephonic signals for all participating parties to the audio teleconference. The establishment of the common point of termination can be accomplished through the use of a teleconference bridge. A teleconference bridge receives inbound and outbound telephone signals from a local telephone switch for each of the participants to different concurrently hosted audio teleconferences. Depending upon the structure of each audio teleconference, either a passcode entered by each attendee calling the bridge routes the call signal to the correct audio teleconference, or an operator manually routes the connection into the correct audio teleconference.

As it is well known, there are two basic types of conference calls: operator dial-out services and operator dial-in services. In an operator dial-out service, an audio teleconference call is planned in advance, and a specified number of lines are provisioned to support the audio teleconference for a specific duration of time. The customer provides the conference call service with the names and telephone numbers of all parties that are to attend the session. At the appointed time, a conference operator dials out to the attendees and places the callers into a common conference line. With this approach, the conference moderator is usually connected last.

In contrast, in a dial-in conference, attendees dial a specific telephone number to connect with the conference bridge. Upon connection, an automated message prompts the caller to enter a pre-assigned passcode for the audio teleconference. Once the correct passcode is entered, the attendee is automatically routed into the call. The moderator to the teleconference, however, is allotted a separate passcode and is granted administrative privileges in respect to the management of the audio teleconference.

In an audio teleconference, the audio teleconference begins as soon as a first caller enters the audio teleconference through dialing the correct passcode, or in the alternative, the audio teleconference begins only once the moderator provides the correct moderator passcode. In the latter instance, waiting callers must patiently and silently await the arrival of the moderator while listening to music in some cases. The inability for the already arrived callers to begin the audio teleconference can be a source of frustration and an inefficient use of time.

BRIEF SUMMARY OF THE INVENTION

Embodiments of the present invention address deficiencies of the art in respect to audio teleconference management and provide a novel and non-obvious method, system and computer program product for threshold activation of an audio teleconference. In an embodiment of the invention, a method for threshold activation of an audio teleconference is provided. The method includes receiving calls into a conference bridge for an audio conference and determining whether or not a threshold number of calls from corresponding callers have been received for the audio conference. The method also includes initiating the audio conference responsive to a threshold number of callers having called into the audio conference, but prohibiting initiation of the audio conference until the threshold number of callers have called into the audio conference.

In one aspect of the embodiment, the method includes establishing weights for different ones of the callers and factoring weights established for callers whom have called into the audio conference when determining whether or not a threshold number of calls from corresponding callers have been received for the audio conference. In another aspect of the embodiment, the method includes applying a rule to the callers of the audio conference to initiate the audio conference despite the threshold number of callers not having called into the audio conference. For example, the rule can specify that an audio conference designated urgent is to initiate once a single caller has called into the audio conference. As another example, the rule can specify that an audio conference designated with a subject associated with a particular topic is to initiate once a single caller has called into the audio conference. In yet another aspect of the embodiment, the method includes adjusting the threshold number responsive to the receipt of a pre-specified event. In even yet another aspect of the embodiment, the threshold number of callers required to initiate the audio conference can be audibly announced to each caller prior to initiating the audio conference.

In another embodiment of the invention, an audio teleconferencing data processing system can be configured for threshold activation of an audio teleconference. The system can include a host computing system and a conference bridge executing in memory of the host computing system. The system also can include a threshold conference activation module coupled to the conference bridge. The module includes program code enabled to determine whether or not a threshold number of calls from corresponding callers have been received for an audio conference in the conference bridge and to initiate the audio conference responsive to a threshold number of callers having called into the audio conference, but to prohibit initiation of the audio conference until the threshold number of callers have called into the audio conference.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for threshold activation of an audio teleconference. In accordance with an embodiment of the invention, a conference bridge can be programmed to initiate an audio teleconference once a predetermined threshold participation level has been reached in respect to the audio teleconference and irrespective of whether or not the moderator for the audio teleconference is present. For example, once a threshold level of participation amongst different invited participants have dialed into the audio teleconference, the audio teleconference can commence. Optionally, different invited participants can be applied weights according to the relevance of the participation of the different invited participants so that the presence of a more highly weighted participant in an audio teleconference act to drive the participation level closer to the threshold level than a less weighted participant.

Figure 1:
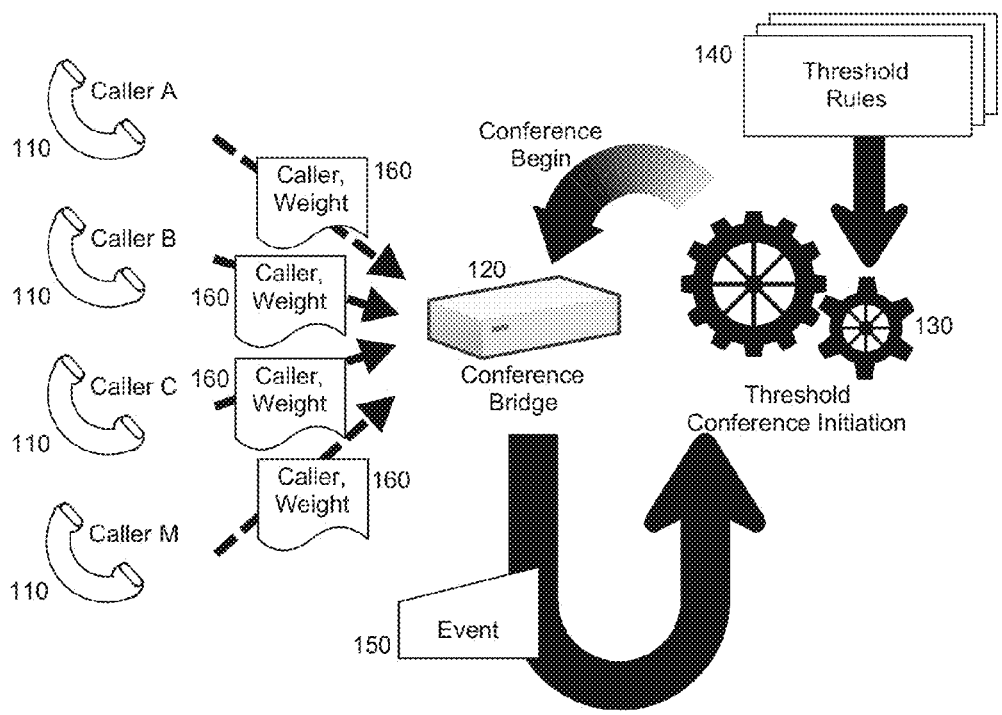
FIG. 1 is a pictorial illustration of a process for threshold activation of an audio teleconference.

In further illustration, FIG. 1 pictorially shows a process for threshold activation of an audio teleconference. As shown in FIG. 1, different callers 110 can call into a conference bridge 120 for an audio conference. Initially, the callers 110 as the callers 110 call into the conference bridge 120 can be placed in a conference hold prior to the beginning of the audio conference during which time the callers 110 that have called into the conference bridge 120 cannot interact within the audio conference. Threshold conference initiation logic 130 can monitor the sequence in which the callers 110 call into the conference bridge 120 for the audio conference and when a threshold number of the callers 110 call into the conference bridge 120, the audio conference can be permitted to begin.

Optionally, a weight 160 can be assigned to one or more of the callers 110, for example according to a perceived importance of an assigned one of the callers 110 to the conduct of the audio conference. Further, one or more threshold rules 140 can be applied by the threshold conference initiation logic 130 in determining when to begin the audio conference. For example, a given one of the threshold rules 140 can state that the audio conference is to begin when one of the callers 110 of a particular role calls into the audio conference, or when a threshold number of the callers 110 of a particular role calls into the audio conference, or when a threshold period of time has elapsed subsequent to a first one of the callers 110 having called into the audio conference, or when the audio conference has a particular subject, or when the audio conference is of a particular importance or urgency, or any combination thereof. Yet further, the threshold conference initiation logic 130 can be configured to adjust the threshold number responsive to a particular event 150 (or series of events) received in the conference bridge 120, for example a change in urgency of the audio conference.

Figure 2:
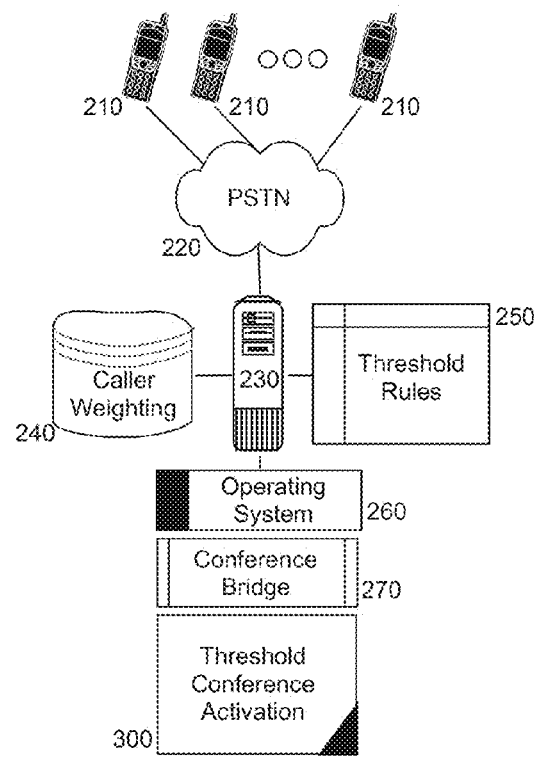
FIG. 2 is a schematic illustration of an audio teleconferencing data processing system configured for threshold activation of an audio teleconference; and, FIG. 3 is a flow chart illustrating a process for threshold activation of an audio teleconference.

The process described in connection with FIG. 1 can be implemented within a teleconferencing data processing system. In yet further illustration, FIG. 2 schematically shows an audio teleconferencing data processing system configured for threshold activation of an audio teleconference. The system can include a host computing system 230 that includes one or more computers each with its own memory and at least one processor. An operating system 260 can execute within the host computing system 230 and the operating system 260 in turn can support the operation of a conference bridge 270 configured to host an audio conference for different calling telephonic devices 210 over a public switched telephone network (PSTN) 220.

A threshold conference activation module 300 can be coupled to the conference bridge 270. The threshold conference activation module 300 can include program code that when executed in the memory of the host computing system 230 can direct the conference bridge 270 to begin an audio teleconference only when a threshold number of participants to the audio conference have called into the conference bridge 270 for the audio conference. The program code of the module 300 further can be enabled to consider different weights applied to the different participants in a data store of caller weighting 240 when computing the threshold number of callers for an audio conference. Even yet further, the program code of the module 300 can be enabled to apply different threshold rules 250 to the determination of whether or not to begin an audio conference irrespective of the number of participants whom have called into the audio conference exceeding a predetermined threshold.

Figure 3:
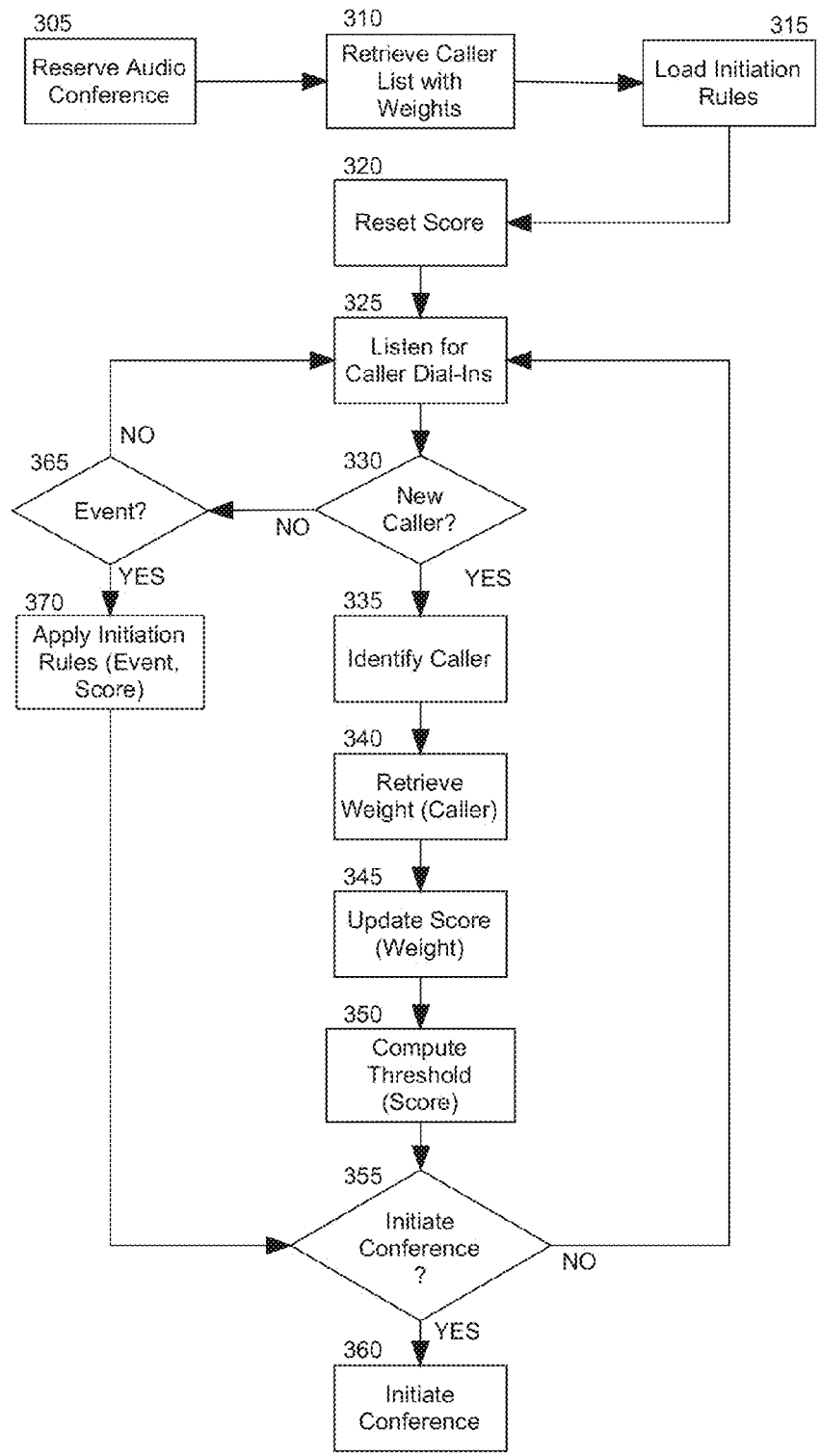

In even yet further illustration of the operation of the threshold conference activation module 300, FIG. 3 is a flow chart illustrating a process for threshold activation of an audio teleconference. Beginning in block 305, an audio conference can be reserved for a specified set of callers and in block 310, a list of the specified callers can be retrieved along with one or more weights for the different callers in the list. In block 315, one or more threshold rules can be loaded. Each of the threshold rules indicating when to direct the beginning of the audio conference based upon the determination of one or more callers in the list having called into the audio conference, the consideration of the weights applied to the callers whom have called into the audio conference and any external events detected in connection with the audio conference.

In block 320, a score can be reset to zero and in block 325, callers dialing into the audio conference can be detected. In decision block 330, if a new caller is determined to have dialed into the audio conference, in block 335 the caller can be identified and a weight retrieved for the caller in block 340. Additionally, the caller can be notified that a threshold number of callers is required to initiate the audio conference and that at the moment, only a number of the required callers have called into the audio conference wherein the number is the score. In block 345, the score can be updated to account for the new caller and also the weight (if any) applied to the caller and in block 350, it can be compared to a pre-determined threshold. If in decision block 355, the updated score exceeds the pre-determined threshold, in block 360 the conference bridge can be directed to initiate the audio conference. Otherwise, the process can repeat in block 325.

Of note, in decision block 330 if a new caller is not detected calling into the audio conference, in decision block 365 it additionally can be determined whether or not an external event has occurred in the conference bridge. If not the process can return to block 325. However, if so, in block

370 the threshold rules can be applied to the event and the score. Thereafter, if in decision block 355, the threshold rules when applied subject to the score indicate that the audio conference is to be initiated, in block 360 the conference bridge can be directed to initiate the audio conference.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. With specific reference to a computer readable storage medium, it is to be understood that a computer readable storage medium excludes transitory media such as transitory signals and other propagation media.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for threshold activation of an audio teleconference, the method comprising:
    reserving an audio conference for a specified set of callers;
    setting a pre-determined threshold number of calls for activating the audio conference;
    receiving calls from one or more telephonic devices into a conference bridge, executing in an operating system of a computer, for the reserved audio conference;
    adjusting, by a processor of the computer, the pre-determined threshold number of calls responsive to receipt of a pre-specified event other than a number of calls received;
    determining, by the processor of the computer, whether or not the adjusted pre-determined threshold number of calls have been received into the conference bridge; and
    initiating the audio conference responsive to the processor of the computer determining that the adjusted pre-determined threshold number of calls have been received into the conference bridge, but prohibiting initiation of the audio conference until the adjusted pre-determined threshold number of calls have been received into the conference bridge unless it is determined, by the processor of the computer, that the audio conference is of a particular importance or urgency, then initiating the audio conference once a single caller has called into the audio conference regardless of the adjusted pre-determined threshold number of calls that have been received into the conference bridge.

2. The method of claim 1, wherein initiating the audio conference responsive to the processor of the computer determining that the adjusted pre-determined threshold number of calls have been received into the conference bridge, but prohibiting initiation of the audio conference until the adjusted pre-determined threshold number of calls have been received into the conference bridge further comprises initiating the audio conference responsive to the processor of the computer determining that the adjusted pre-determined threshold number of calls have been received into the conference bridge, but prohibiting initiation of the audio conference until the adjusted pre-determined threshold number of calls have been received into the conference bridge unless it is determined, by the processor of the computer, that the audio conference has a particular subject, then initiating the audio conference once a single caller has called into the audio conference regardless of the adjusted pre-determined threshold number of calls that have been received into the conference bridge.

3. An audio teleconferencing data processing system configured for threshold activation of an audio teleconference, the system comprising:
    a host computing system;
    a conference bridge executing in a memory of the host computing system; and,
    a threshold conference activation module executing in the memory of the host computing system and coupled to the conference bridge and comprising program code enabled to cause a processor of the host computing system to
        set a pre-determined threshold number of calls for activating an audio conference;
        receive calls from one or more telephonic devices into the conference bridge;
        adjust the pre-determined threshold number of calls responsive to receipt of a pre-specified event other than a number of calls received;
        determine whether or not the adjusted pre-determined threshold number of calls have been received into the conference bridge; and
        initiate the audio conference responsive to determining that the adjusted pre-determined threshold number of calls have been received into the conference bridge, but prohibit initiation of the audio conference until the adjusted pre-determined threshold number of calls have been received into the conference bridge unless it is determined that the audio conference is of a particular importance or urgency, then to initiate the audio conference once a single caller has called into the audio conference regardless of the adjusted pre-determined threshold number of calls that have been received into the conference bridge.

4. The system of claim 3, wherein the program code of the threshold conference activation module enabled to initiate the audio conference responsive to determining that the adjusted pre-determined threshold number of calls have been received into the conference bridge, but to prohibit initiation of the audio conference until the adjusted pre-determined threshold number of calls have been received into the conference bridge further comprises program code to initiate audio conference responsive to determining that the adjusted pre-determined threshold number of calls have been received into the conference bridge, but to prohibit initiation of the audio conference until the adjusted pre-determined threshold number of calls have been received into the conference bridge unless it is determined that the audio conference has a particular subject, then to initiate the audio conference once a single caller has called into the audio conference regardless of the adjusted pre-determined threshold number of calls that have been received into the conference bridge.

5. A computer program product for threshold activation of an audio teleconference, the computer program product comprising:
    a computer readable storage medium having computer readable program code embodied therewith, the computer readable program code, when executed by a computer, causes the computer to perform the steps comprising:

reserving an audio conference for a specified set of callers;

setting a pre-determined threshold number of calls for activating the audio conference;

receiving calls from one or more telephonic devices into a conference bridge for the reserved audio conference;

adjusting the pre-determined threshold number of calls responsive to receipt of a pre-specified event other than a number of calls received;

determining whether or not the adjusted pre-determined threshold number of calls have been received into the conference bridge; and initiating the audio conference responsive to determining that the adjusted pre-determined threshold number of calls have been received into the conference bridge, but prohibiting initiation of the audio conference until the adjusted pre-determined threshold number of calls have been received into the conference bridge unless it is determined that the audio conference is of a particular importance or urgency, then initiating the audio conference once a single caller has called into the audio conference regardless of the adjusted pre-determined threshold number of calls that have been received into the conference bridge.

6. The computer program product of claim 5, wherein the computer readable program code to initiate the audio conference responsive to determining that the adjusted pre-determined threshold number of calls have been received into the conference bridge, but prohibiting initiation of the audio conference until the adjusted pre-determined threshold number of calls have been received into the conference bridge further comprises computer readable program code to initiate the audio conference responsive to determining that the adjusted pre-determined threshold number of calls have been received into the conference bridge, but to prohibit initiation of the audio conference until the adjusted pre-determined threshold number of calls have been received into the conference bridge unless it is determined that the audio conference has a particular subject, then to initiate the audio conference once a single caller has called into the audio conference regardless of the adjusted pre-determined threshold number of calls that have been received into the conference bridge.

* * * * *